United States Patent [19]

DiChiara et al.

[11] Patent Number: 4,858,117
[45] Date of Patent: Aug. 15, 1989

[54] APPARATUS AND METHOD FOR PREVENTING COMPUTER ACCESS BY UNAUTHORIZED PERSONNEL

[75] Inventors: Joseph G. DiChiara, Burlington; Harry W. Brown, East Weymouth; Joseph M. Valentine, Framingham, all of Mass.

[73] Assignee: Bull HN Information Systems Inc., Billerica, Mass.

[21] Appl. No.: 83,534

[22] Filed: Aug. 7, 1987

[51] Int. Cl.⁴ .................. G06F 12/10; G06F 12/12; G06F 12/14
[52] U.S. Cl. .................. 364/200; 364/256.5; 364/286.4
[58] Field of Search ... 364/200 MS File, 900 MS File

[56] References Cited

U.S. PATENT DOCUMENTS

| | | | |
|---|---|---|---|
| 3,787,813 | 1/1974 | Cole et al. | 364/200 |
| 4,084,227 | 4/1978 | Bennett et al. | 364/200 |
| 4,092,715 | 5/1978 | Scriver | 364/200 |
| 4,155,119 | 5/1979 | De Ward et al. | 364/200 |
| 4,419,728 | 12/1983 | Larson | 364/200 |

*Primary Examiner*—Eddie P. Chan
*Attorney, Agent, or Firm*—George Grayson; John S. Solakian; Lewis P. Elbinger

[57] ABSTRACT

The apparatus provides a secure input/output command system by the operating system generating a virtual input/output command including a virtual channel number, verifying that the user has authorization to access the processes and the device, and then generating a physical input/output command for transfer over a system bus to the device addressed by the physical channel number included in the command.

5 Claims, 7 Drawing Sheets

APPARATUS AND METHOD FOR PREVENTING COMPUTER ACCESS BY UNAUTHORIZED PERSONNEL

SCOPE OF THE INVENTION

This invention relates generally to the data processing field, and more particularly to the apparatus for providing a more secure input/output (I/O) system.

DESCRIPTION OF THE PRIOR ART

Protection is required of data processing systems to separate multiple users from each other, and users from the operating system. Protection refers to a mechanism for controlling the access of programs, processes, or users to the resources of a computer system. Protection is basically an internal problem—the requirement of controlling access to programs and data stored in a computer system.

Computer security requires an adequate protection system and also consideration of the external environment the computer is to be operated in. Security is the mediation of access by subjects within a computer system to objects based upon a policy that the system is enforcing. Assurance is a measure of confidence that the integrity of a system and its data will be preserved.

Secure systems should possess certain capabilities such as:

1. Access Control—People/objects attempting to access computers can be positively and reliably identified.
2. Process Control Integrity—Persons/objects will be restricted to particular functions and separation of users must be assured.
3. Violations of system security can be detected.
4. Messages between users and the computer can be kept secret and tamper-proof.
5. Hardware and software can be made tamper-proof.
6. Systems can be designed with high reliability.

Many of these capabilities are found in other computing systems, typically the Multics* system in use at Massachusetts Institute of Technology and the Honeywell Secure Communications Processor (SCOMP).

*Trademark of Massachusetts Instiute of Technology

Multics stores the processes in privileged rings in memory for security reasons and uses virtual addressing. However the Multics system does not take advantage of the protection afforded by using the virtual I/O command system.

The SCOMP system also stores the processes in privileged rings in memory for security reasons and uses virtual addressing. But SCOMP also takes advantage of the protection afforded by using the virtual I/O command system. However SCOMP includes separate logic boards for performing the virtual I/O to physical I/O translation.

OBJECTS OF THE INVENTION

Accordingly it is an object of this invention to provide a data processing system having an improved security input/output (I/O) command system that is less costly to implement and has an improved throughput.

This invention is pointed out with particularity in the appended claims. An understanding of the above and further objects and advantages of this invention can be obtained by referring to the following description taken in conjunction with the drawings.

DESCRIPTION OF THE DRAWINGS

The manner in which the method of the present invention is performed and the manner in which the apparatus of the present invention is constructed and its mode of operation can best be understood in the light of the following detailed description together with the accompanying drawings in which like reference numbers identify like elements in the several figures and in which.

SUMMARY OF THE INVENTION

This invention provides multilevel security within a computer system of input/output (I/O) commands sent over a system bus to peripheral devices.

An I/O command sent over the system bus includes a physical channel number identifying the device and a function code which specifies the function the device will perform. The operating system generates a virtual I/O command which includes a ring number, a virtual channel number and the function code.

Firmware performs a number of checks on the virtual I/O command before translating the virtual channel number to the physical channel number. These checks which are made before the physical I/O command is generated include:

a—verifying that the user is privileged to access the process, b—verifying that the IOLD buffer is within a 2 KB limit, c—verifying that the descriptors are valid and that the user is permitted access to the device, d—verifying the virtual channel number location of the I/O descriptor against the size of the page table containing the descriptor, and e—verifying the IOLD data buffer is marked as an IOLD buffer by the system software.

This is accomplished by the firmware which accesses a reserved portion of a control store using a number of registers and tables to perform the verification and translation of virtual address to physical address.

The operating system generates a tree of memory descriptors and device descriptors and stores a pointer to this data structure information in a descriptor segment base register. The information specifies the base address of a descriptor segment page table. A value of the high order bit of the virtual channel number is used to determine the constant to be added to the base address to give the physical memory address of I/O page descriptor words. The I/O page descriptor includes a validity bit, the size of the I/O descriptor table and the base address of the I/O descriptor table. The virtual channel number is added to the base address as an index to the I/O descriptor.

The I/O descriptor includes a validity bit, a read or a write permission bit, ring bracket bits, and a physical channel number. The firmware checks the validity bit, verifies that the virtual I/O command calls for the proper read or write operation, verifies the ring bracket bits against the virtual I/O command ring number. If all of these checks perform correctly, then the physical channel number replaces the virtual channel number in the command and the physical I/O command is sent out over the system bus.

There is a descriptor segment page table and an I/O descriptor table for each user. This enables the operating system to readily change the privileges of a user.

DESCRIPTION OF THE PREFERRED EMBODIMENT

Figure 1:
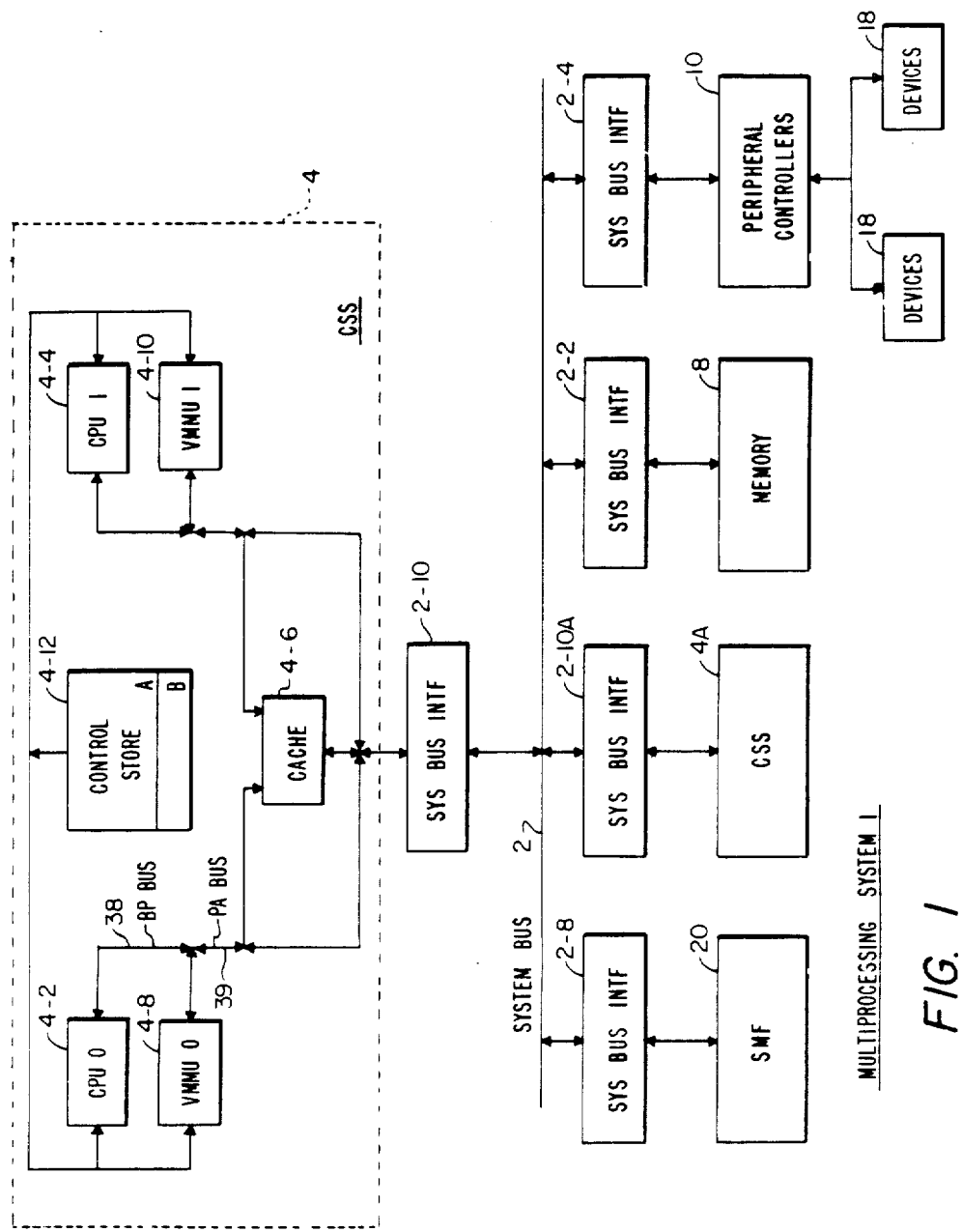
FIG. 1 is an overall block diagram of a data processing system.

FIG. 1 shows a multiprocessing system, which includes a number of subsystems, each coupled to an asychronous system bus 2 by a separate interface.

These subsystems include a central subsystem (CSS) 4 coupled to system bus 2 by system bus interface (SBI) 2-10 and a CSS 4A coupled to system bus 2 by SBI 2-10A. Only two CSS's are shown, however any number of CSS's may be coupled to system bus 2 by their respective interfaces. Each of the SBI's include bus interface logic circuits of the type disclosed in FIG. 9 of U.S. Pat. No. 3,995,258.

Also coupled to system bus 2 via an SBI 2-8 is a system management facility (SMF) 20. A memory sybsystem 8 is coupled to system bus 2 by a SBI 2-2. A number of peripheral controllers 14, typically, a disk controller, a unit record controller, a magnetic tape controller, a communications controller and the like may be coupled to system bus 2 by their respective SBI's, similar to SBI 2-4. Each peripheral controller 14 has coupled to it, a number of appropriate devices 18.

Each CSS includes a cache, a control store, two central processor units (CPU) and their respective virtual memory management units (VMMU). CSS 4 includes a CPU 0 4-2, with its VMMU 0 4-8, a CPU 1 4-4 with its VMMU 1 4-10, a control store 4-12 and a cache 4-6. Although a CSS having dual CPU's is disclosed, it is understood that the invention may be incorporated in a system having a single CPU.

All communications between subsystems is accomplished by one subsystem sending out a command on system bus 2 and receiving a response from the addressed subsystem.

SMF 20 controls the initialization of system 1, as well as the monitoring of a number of system and environmental functions. SMF 20 includes a watchdog timer and a real time clock which are set by commands received by SMF 20 and from system bus 2 from one of the CPU's. The SMF 20 responds when the watchdog timer has decremented to zero by sending a corresponding command over system bus 2 to the CPU that initially sets the clock. In addition the SMF 20 monitors the power and temperature and alerts the subsystems if the power or temperature exceed predetermined limits. The SMF 20 operation is described in application Ser. No. 869,164 entitled "System Management Apparatus for a Multiprocessor System".

The system supports both physical addresses and virtual addresses. Most software visible addresses are virtual addresses. The VMMU will translate the virtual addresses to physical addresses. The physical addresses are used by the CPU to address cache or memory. For example CPU 0 4-2 will send a virtual address to VMMU 0 4-8 over the bus BP 38. VMMU 0 will translate the virtual address to a physical address and send the physical address to cache 4-6 and memory 8 via a bus PA 39. If the contents of the physical address is stored in cache 4-6, then it will be sent immediately back to CPU 0 4-2, otherwise the command containing the physical address is sent to memory 8 via SBI 2-10, system bus 2 and SBI 2-2. The contents of the physical address location will be sent back to the CPU 0 4-2 via SBI 2-2, system bus 2 and SBI 2-10 by a response command.

A security kernel, consisting of operating system software, CPU and VMMU hardware, and virtual I/O processing is the implementation of a reference monitor for the secure DPS6 PLUS product. The reference monitor is an abstract concept that must meet three security requirements. These are:

1. Complete mediation of subjects to objects,
2. Isolation, and
3. Verification.

The complete mediation aspect is met by the Virtual Memory Management Unit which mediates all requests to memory. This mediation procedure also includes access permission checking. The virtual I/O firmware is also part of this requirement. All I/O commands are virtual and are allowed on the basis of certain access permissions and checking procedures.

The isolation aspect is met by the use of a hardware ring structure that separates security and system processing from user application processing. This feature is also enforced by the underlying hardware and firmware which compares the domain of execution with permissions allowed and contained in descriptor data structures.

The verification aspect is met by the generation of a formal top level specification which is compared to and verified with a formal or informal mathematical model of the security policy to be enforced. The model used is dependent upon the certification level being sought as described in the "Trusted Computer Security Evaluation Criteria" (DOD 5200.28-STD - December 1985).

I/O commands generated by the operating system include a virtual channel number and a ring number. The firmware verifies the ring number and the validity of the command, and in conjunction with an I/O Descriptor Table stored in memory 8 translates the virtual channel number to the physical channel number. The I/O command which includes the physical channel number is sent out over system bus 2. The peripheral subsystem recognizing its physical channel number acknowledges the acceptance of the command and performs the operation specified by the function code portion of the command.

All of the CPU and VMMU operations are controlled by selected bits of control store words read out from control store 4-12. Control store 4-12 is divided into an A portion for controlling normal CSS operation including virtual address to physical address translation, and a B portion for controlling the implementation of the virtual I/O within the existing virtual memory system.

Virtual I/O processing provides security by separating the system 1 resources from the user domain. This assures that the necessary permission checks are completed before the I/O command is sent out over system bus 2 to the peripheral subsystem.

FIGS. 2A through 2D show the I/O command sent out over system bus 2. FIG. 2E shows the format of the virtual I/O command with ring number and virtual channel number and the translated physical I/O command with its physical channel number.

Figure 2A:
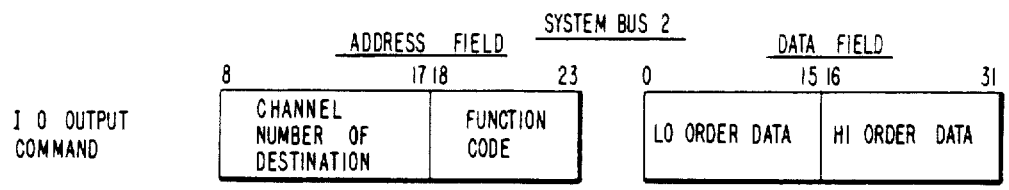
FIGS. 2A through 2E show the format of the input/output commands.
Figure 2B:
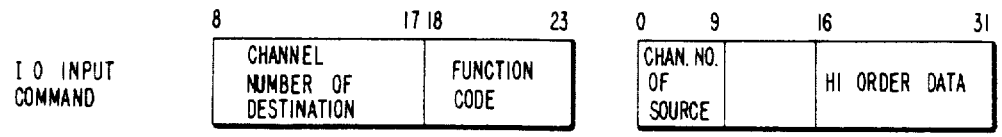
Figure 2C:
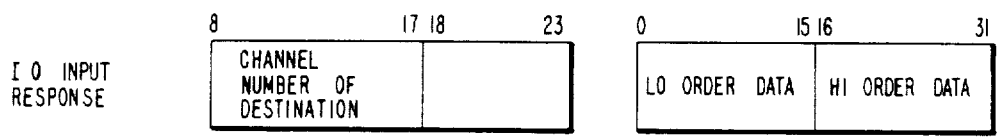

Note that throughout the specification the notation "I0" will refer to FIGS. 2A, 2B and 2C. The notation "I/O" will refer to FIGS. 2A, 2B, 2C and 2D; that is, the notation "I/O" will encompass I0 and IOLD.

FIG. 2A shows the format of an IO output command generated by the CPU. The signals over system bus 2 include 32 address signals 0–23, A–H, and 32 data signals 0–31. Also included are a number of control signals (not shown). For L the IO output command, address signals 8–17 specify the physical channel number of the distribution subsystem, address signals 18–23 specify the function code. Data bits 0–31 specify information which is transferred to the subsystem specified by the channel number. The data bits will perform as specified by the function code.

FIG. 2B shows the format of the I0 input command generated by the CPU which includes the channel number of the device and the function code specifying the information requested by the CPU. Data bits 0–9 specify the physical channel number of the CPU that generated the command. Data bits 16–31 specify optional information for the device.

FIG. 2C shows the format of the IO response to the IO input command. The physical channel number of the source is now the physical channel number of the destination. Data bits 0–31 specify the information requested by the function code of the originating command. There is no virtual to physical channel number translation required for the source channel number of FIG. 2B and the physical channel number of FIG. 2C.

Figure 2D:
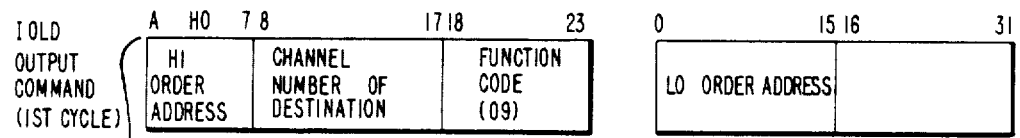
Figure 2D:
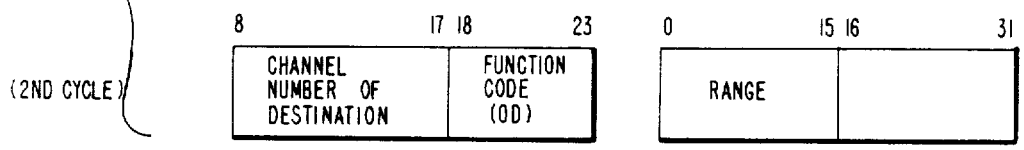
Figure 2E:
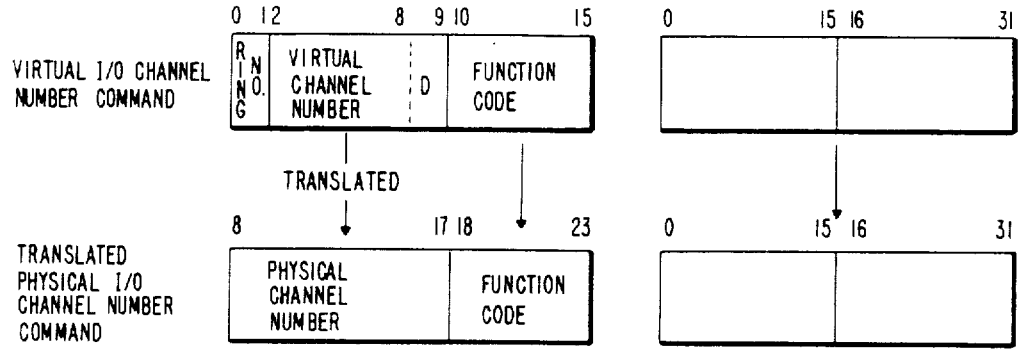

FIG. 2D shows the format of the 2 cycles of the input/output load (IOLD) output command. The first cycle specifies the starting memory 8 address of a block transfer and the second cycle specifies the range or number of words in the block.

Note that the function code of hexadecimal 09 indicates the 32 bit address is specified by the 16 address bits A–H, 0–7 and 16 data bits 0–15. Function code hexadecimal OD indicates that data bits 0–15 specify the range. Address bits 8–17 specify the channel number of the same device during both bus cycles.

FIG. 2E shows the format of the virtual I/O channel number command and the format of the translated physical I/O channel number command. Note that the physical channel number specified by address bits 8–17 of FIGS. 2A, 2B and 2D were translated from the virtual channel number 2–8 and the direction (D) bit 9. The remaining address and data bits are transferred without translation.

I/O channel numbers range from hexadecimal 010 through 3FF. CPU channel numbers range from hexadecimal 000 through 00F. Full duplex devices, such as communication lines, use two channel numbers with the low order bit (D) identifying which half of the line, transmit or receive, is being addressed.

Virtual channels range from 0–63, with one page of kernel-only I/O descriptors, and one page of shared I/O descriptors. The page to be accessed is determined by Bit 2 (MSB) of the virtual channel number.

Half duplex devices, such as tape drives, use the D bit at logical 0 to specify an input operation and at logical 1 to specify an output operation.

Unidirectional devices, such as card readers, would have the D bit set at logical 0 (an even function code).

Ring protection consists of a set of hierarchical levels of protection and may be visualized as a set of N concentric circles numbered 0, 1, 2, . . . N−1, from the inside out. The memory 8 space included in circle 0 is called ring 0, the memory 8 space included between circles 1 and 2 is called ring 2. Every segment of a process is placed in one ring of memory 8. The closer a segment is to the center, the greater its protection and privilege. Four rings numbered 0, 1, 2 and 3 are supported by the CSS, ring 0 is the most privileged and ring 3 the least.

The Security Kernel of the Operating System with the exception of the I/O resides in the ring 0. The process scheduling of the memory management resides in ring 1. Trusted software resides in ring 2. Trusted software can violate either a security or integrity property enforced by the Security Kernel. Trusted software also provides functionality requiring high integrity. User Applications are in ring 3, the least privileged and are supported by an untrusted ring 2 Secure Kernel Interface Package. Application Software cannot run on top of trusted software.

A user is given a classification by the operating system. The classifications are unclassified, secret and top secret. This gives the user access to processes in specific rings. Assuming a user with a top secret classification is given access to ring 1, a secret user is given access to ring 2 and an unclassified user is given access to ring 3, then the following rules apply. A user cannot read up; that is, a user with a secret classification who is given access to processes in ring 2 cannot read processes in ring 1 or ring 0. A user cannot write down; that is, the user with the secret classification may not write a process in ring 3.

A procedure has associated with it three ring numbers R1, R2 and R3, called its ring brackets. If R3>R2, the procedure is a gate for ring R2, accessible from rings no higher than R3. If R2=R3, the procedure is not a gate.

Figure 3:
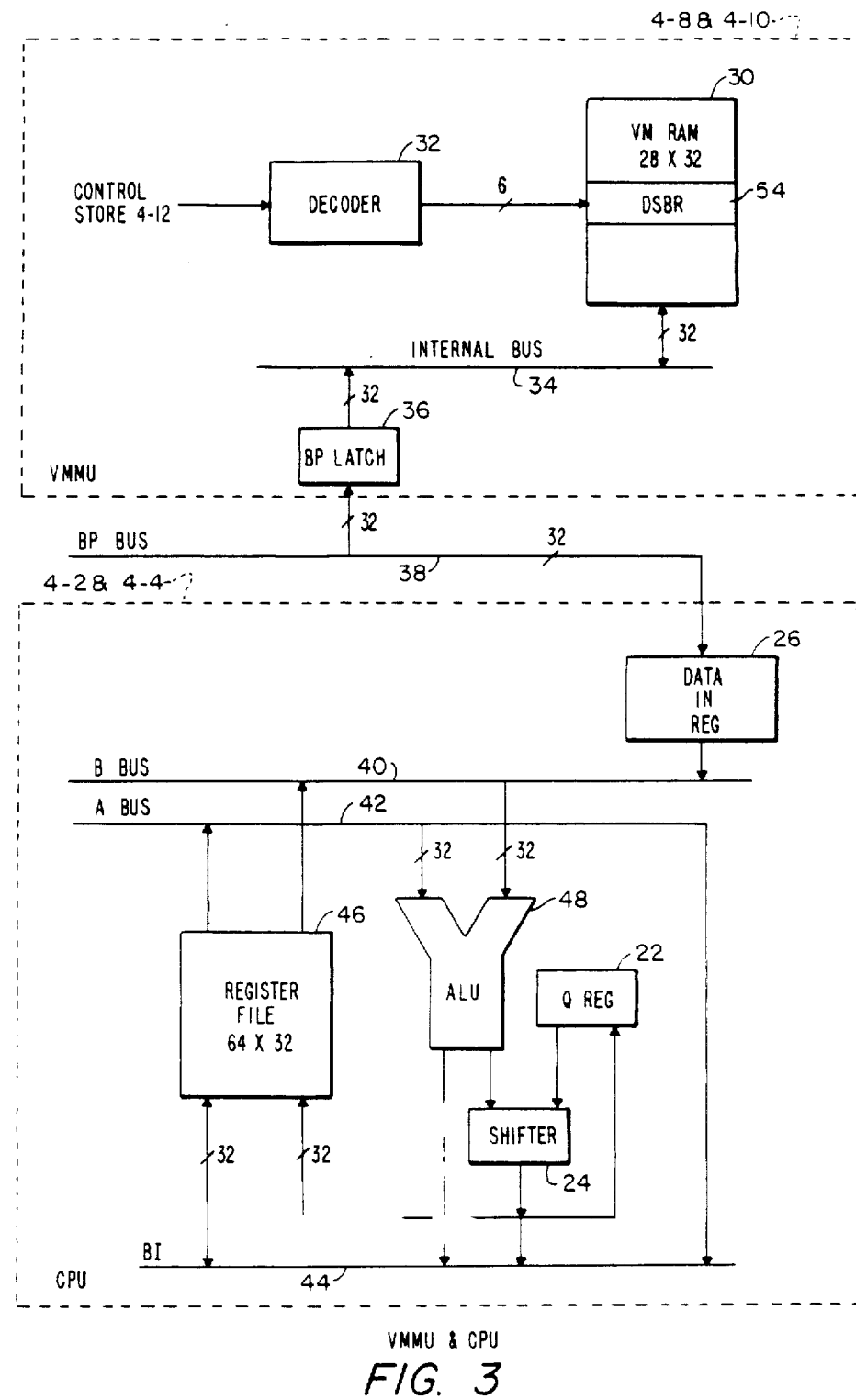
FIG. 3 is a partial block diagram of the virtual memory management and central processing unit.

FIG. 3 shows a portion of the VMMU and the CPU which are a part of the invention. It should be noted that VMMU 0 4-8 and VMMU 1 4-10, as well as CPU 0 4-2 and CPU 1 4-4 are duplicates. Therefore VMMU 0 4-8 and CPU 0 4-2 will be used to describe the invention. However it is understood that the invention could operate equally well with VMMU 1 4-10 and CPU 1 4-4.

A register file 46 of CPU 0 4-2 includes sixty-four 32 bit registers. The functions of these registers are described in U.S. application Ser. No. 722,237, entitled "Microprocessors on a ingle Semiconductor Chip". Also included is a descriptor segment base register that is duplicated in the VMMU 0 4-8 VM-RAM 30.

Operands are received from BP bus 38, stored in a data-in register 26, and stored in a register of register file 46 via B bus 40, an arithmetic logic unit (ALU) 48, a BI bus 44, or a shifter 24 and BI bus 44. An arithmetic operation is performed on two operands in register file 46 by reading one operand into the A bus 42 and another operand over B bus 40, and applying both operands to their respective ALU 48 inputs.

The ALU 48 performs the arithmetic operation specified by control store 4-12 signals (not shown). The result of the arithmetic operation is written back into register file 46 vis BI bus 44 or via the shifter and the BI bus 44.

A 32 bit Q register 22 acts as an extension of the ALU 48 to process 64 bit operands. Q register 22 also stores partial products and partial quotients during the execution of binary multiplication and division instructions. The shifter 24 is operative with the ALU 48 for executing normal 32 bit shift operations. The shifter 24 is operative with the Q register 22 and the ALU 48 to execute 64 bit shift operations. Control signals (not shown) from control store 4-12 control all of the operations of the register file 44, ALU 48, shifter 24, Q register 22 and data-in register 26.

The VMMU 0 4-8 includes a decoder 32 which receives control store 4-12 signals to address one of the twenty-eight locations of a 32 bit virtual memory random access memory (VM-RAM) 30. The portion of the DSBR 54 of this invention is stored in two locations of the VM-RAM 30. Information is loaded into VM-RAM 30 from BP bus 38, BP latch 36 and internal bus 34. Control signals (not shown) control the input and output of latch 36.

Figure 4:
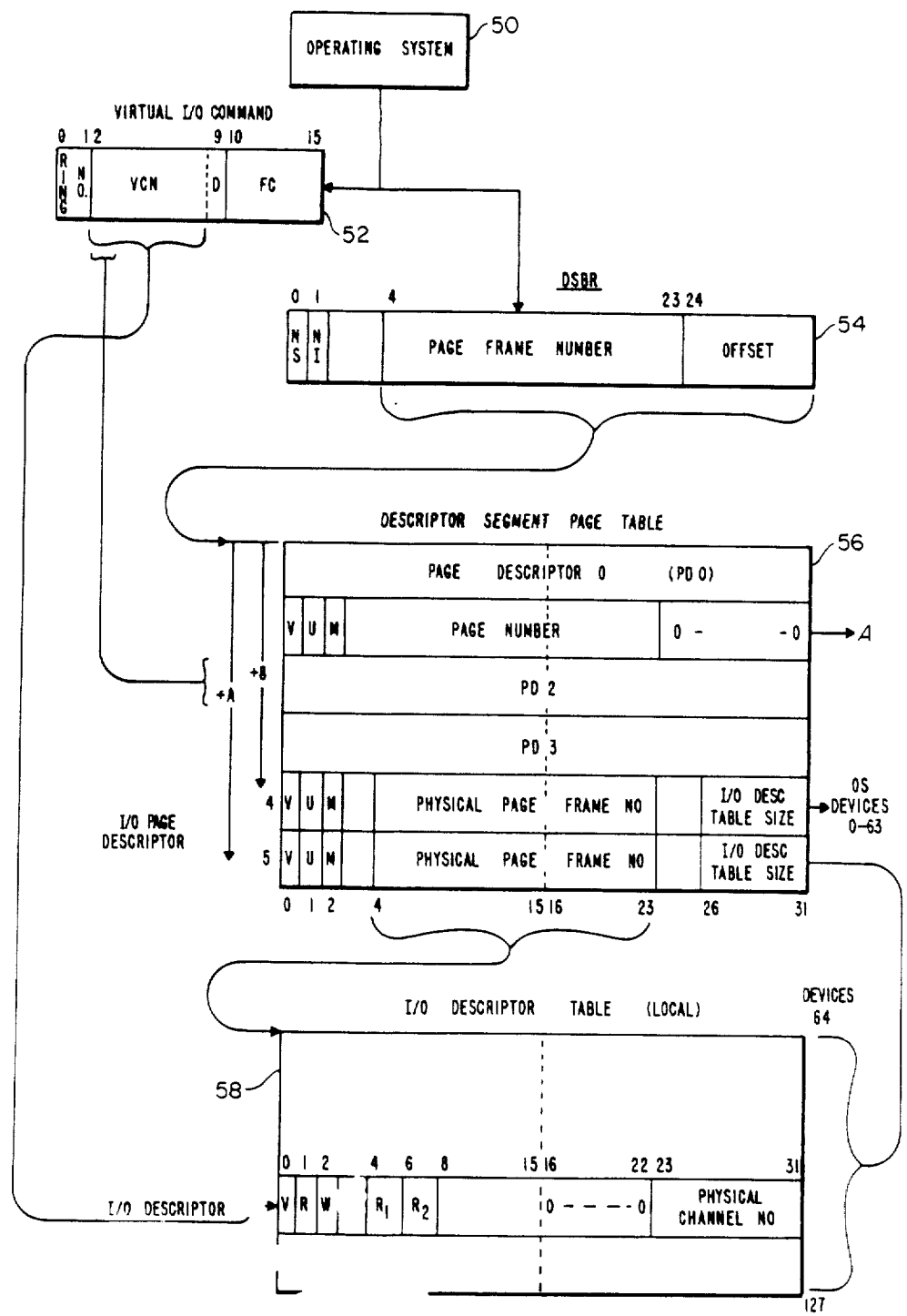
FIG. 4 is a block diagram of the register and tables of the secure input/output system.

FIG. 4 shows the logic flow for translating the virtual I/O command to a physical I/O command as shown in FIG. 2E.

The operating system maintains an access control list for each device that defines which users have access to the device. Whenever a process needs to address a new device, the operating system checks the list of the target devices to determine if access is allowed to the process. If access is allowed, the operating system 50 generates the virtual I/O command 52 which is stored in a location in memory 8 and also loads the following information into DSBR 54 which is stored in the location in VM-RAM 30.

Bit 0, if set, indicates that a new stack is to be used and the Call and Return Instructions are allowed. This is not a part of the invention and is therefore not described further.

Bit 1, if set, indicates that virtual I/O commands are generated by the operating system 50.

Bits 4-23 specify the physical page frame base address in memory 8. However, bits 24-31 offset the base address to allow a descriptor segment page table 56 to start at a module 4 word boundary.

The descriptor segment page table 56 includes four page descriptors PD0 through PD3 which are used in the normal virtual memory address to physical memory address translation. This normal operation also includes processing the IOLD range commands.

The descriptor segment page table 58 also includes an I/O page descriptor 4 and an I/O page descriptor 5. The state of the high order bit of the virtual channel number (bit 2 of the virtual I/O command) specifies that hexadecimal 8 is added to the offset base address to locate I/O page descriptor 4. Hexadecimal A is added to the offset base address to locate I/O page descriptor 5.

The I/O page descriptor 4 points to a table of 64 I/O descriptors (not shown) and I/O page descriptor 5 points to a table of 64 I/O descriptors identified as 63 through 127. The I/O descriptor is typical of those selected by I/O page descriptor 5.

There are 128 I/O descriptors divided into 64 global descriptors and 64 local descriptors. Global descriptors are considered system device descriptors and are used to allow the security kernel to access the kernel file system devices within any process. Local descriptors are defined as being private to the process and are associated with the user I/O devices which are mapped into the processes address space by the security kernel.

The information in the I/O page descriptor 5 is as follows.

Bit 0 specifies the valid indicator (V) which indicates a valid I/O page descriptor.

Bit 1 specifies the used indicator (U) which indicates that the page was accessed.

Bit 2 specifies the modified indicator (M) which indicates that the page was modified.

Bits 4-23 specify the physical page frame number address of the I/O descriptor table 58.

Bits 26-30 specify the number of virtual device descriptors in the I/O descriptor table 58. A fault is indicated if the virtual channel number is larger than the I/O device table size.

The physical page frame number specifies the memory 8 base address of the I/O descriptor table 58. The virtual channel number bits 2-8 point to the I/O descriptor in the I/O descriptor table 58.

The I/O descriptor defines the access rights the process has to the device for the read or write operation, and the physical channel number of the device. Other information in the I/O descriptor is as follows.

Bit 0, the valid indicator (V) indicates an I/O channel fault, (trap 37), if at ZERO.

Bit 1, the read-permit indicator (R) allows an IOLD instruction specifying a read operation if the bit is a ONE and the process is being executed in a ring number less than or equal to R2. If this access check is not met, then an I/O channel access fault, (trap 38), is indicated.

Bit 2, the write-protect indicator (W) allows an IOLD specifying a write operation if the bit is a ONE and the process is being executed in a ring less than or equal to R1. If this access check is not met, then an I/O channel access fault is indicated.

For IOLD instructions, bits 4 and 5, R1, specifies the highest ring number of the write bracket for the media of this device. Bits 6 and 7, R2, specifies the highest ring number of the read bracket for this device.

For IO instructions, bits 4 and 5, R1, specifies the highest ring number of the control bracket for this device.

Bits 16-22 must be ZERO and bits 23-31 plus the original direction bit D of the virtual channel number make up the physical channel number of the I/O device and whether the command is a read command or a write command.

The DSBR 54 is loaded with a unique frame number and offset for each user. DSBR bits 4-31, therefore, point to a unique Descriptor Segment Page Table 56. There are as many descriptor segment page tables 56 as there are users. There is also a unique process descriptor segment 60 for each user.

The total memory size for system 1 is up to 16 megabytes of physical memory and 2 gigabytes of virtual memory. Memory 8 stores the physical memory bytes and a number of mass storage devices store the virtual memory bytes.

A segment size may be up to 2 megabytes. A process may include up to 1024 segments. A page contains 2K bytes with up to 1024 pages per segment. The virtual address is expressed as a 10 bit segment number and a 20 bit displacement, which in conjunction with the contents of the DSBR 54 and the following tables generate the memory 8 physical address of the desired double word (30 bits).

In the unique process descriptor segment that contains all descriptors of a process, the descriptor segment page table 56 includes descriptor (PD) 0 which points to segment descriptors (SD) 0-255, PD 1 which points to SD 256-511, PD 2 which points to SD 512-767 and PD 3 which points to SD 768-1023.

PD 0 through PD 3 each point to their respective segment descriptor tables. The contents of the segment descriptor tables, if paged, point to a table of page descriptors. The page table stores descriptors that contain the physical addresses in main memory 8 which correspond to the virtual address generated by the operating system. This is normal system operation for translating virtual memory addresses to physical memory addresses.

During normal operation the IOLD range command of FIG. 2D is processed as follows.

A selected page descriptor of descriptor segment page table 56, for example PD1, is loaded with the page number of a processor descriptor segment 60. Each processor descriptor segment 60 includes 256 segment descriptors per page. In addition to the validity (V) bit 0, bit 1 is a privileged indicator (PR). If set, execution of privileged instructions is allowed only if in ring 0. If not set, no privileged instructions are allowed and if one is encountered then a trap 13 is called. The IOLD (IO) bit 2 set indicates that this is an IOLD buffer segment for direct memory access (DMA) transfers. If not set and an IOLD instruction is executed specifying this segment, then a protected memory trap 14 is called.

The page number bits 4 through 22 plus the offset bits 23 through 31 of the processor descriptor segment 60 point to a selected page descriptor (PDX) of an IOLD buffer segment page table 62 which stores 1024 thirty-two bit page descriptors.

Bits 0, 1 and 2 (V, U and M) were described supra. The page number bits 4 through 23 of the IOLD buffer segment page table 62 points to an IOLD buffer segment page frame 64 in memory 8. The maximum buffer page size is 2048 bytes if the page number of the IOLD buffer segment page table 62 points to the base address of the page frame 64. If the base address is incremented by an offset, then the range is less than 2048 bytes since a page crossing is not allowed.

It should be noted that during the first translation for a user of virtual I/O to physical I/O, that portions of the contents of the descriptor segment page table 56 and portions of the contents of the I/O descriptor table 58 are brought into cache 4-6. Subsequent I/O command translations required for the same user may be accomplished at the cache 4-6 speed rather than the slower memory 8 speed.

Figure 5:
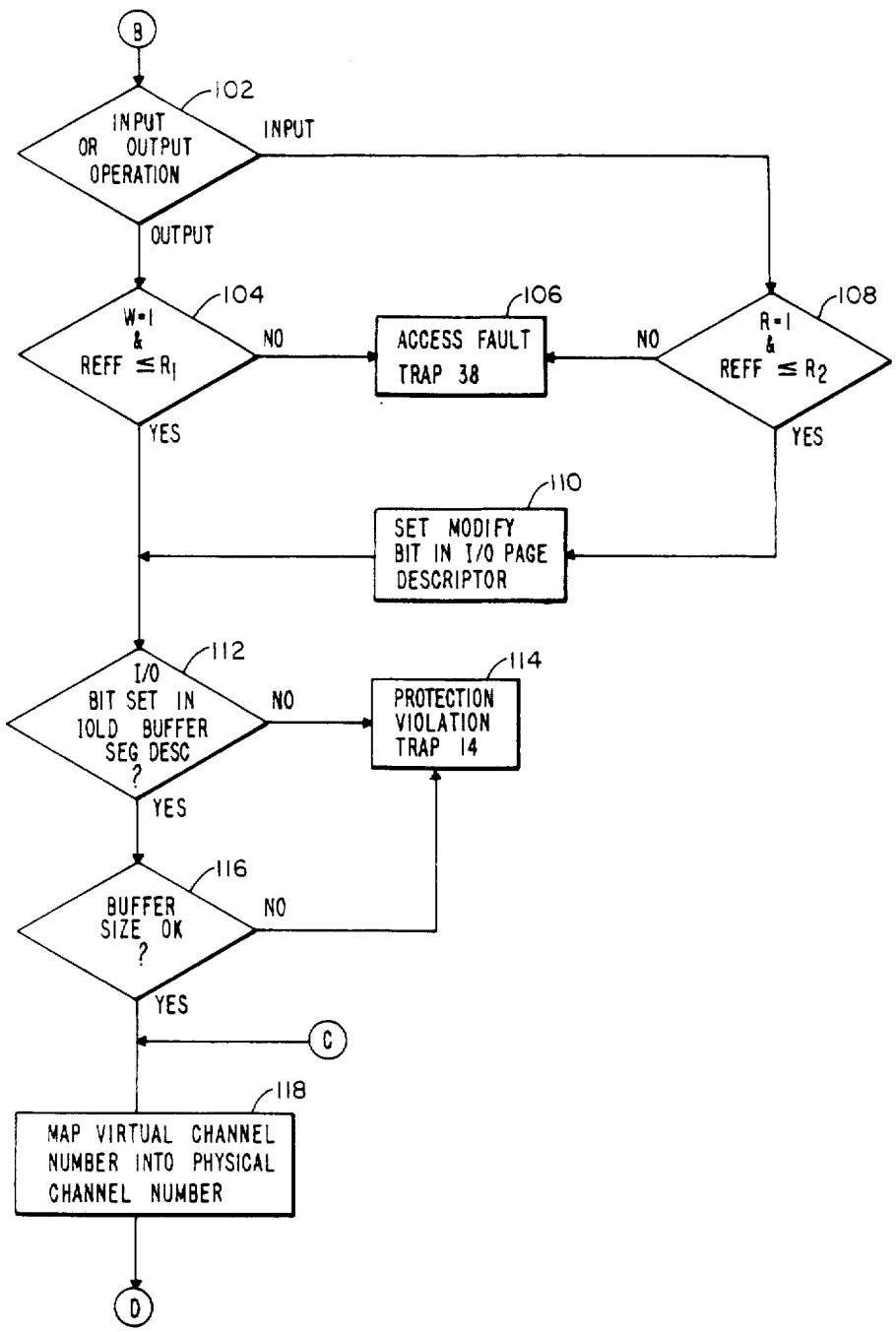
FIG. 5 is a flow diagram of the virtual input/output firmware implementation.

For the FIG. 5 description the commands of FIGS. 2A through 2C are called IO commands and the commands of FIG. 2D are called IOLD commands. The firmware will treat both cycles of the IOLD command as an IOLD command. Then notation I/O will refer to both IO and IOLD.

FIG. 5 is a flow diagram of the Virtual I/O Firmware implementation. The CPU 0 4-2 executes the software instructions which in turn address the B portion of the control store 4-12 in order to translate the virtual I/O channel number to the physical I/O channel number.

Decision block 72 tests bit 1 of the contents of the DSBR 54 and branches to block 74 if this is not a virtual I/O operation. The decision blocks are implemented by transferring information to register file 46, FIG. 3, performing the actions called for in ALU 48 and shifter 24 and transferring the result back into register file 46 where it is available to the firmware. This is accomplished by signals from control store 4-12. Block 74 interprets the command as having a physical channel number and causes the CPU 0 4-2 to send the command directly over system bus 2. Otherwise decision block 76 reads bits 0 and 1 of the current ring number of the I/O instruction in memory that the CPU 0 4-2 is executing. If it is not a privileged instruction; that is, it is not a ring 0 or ring 1 instruction, then block 78 calls for a trap 13 to notify the operating system to stop the process.

Otherwise block 80 computes the location in memory 8 of the I/O page descriptors 4 or 5 of the descriptor segment page table (DSPT) 56. This is done by the CPU 0 4-2 adding the base address, (bits 4-31 of descriptor segment base register 54) to either hexadecimal 8 or hexadecimal A, depending on the state of the high order bit of the virtual channel number (bit 2).

Block 82 fetches the I/O page descriptor from memory 8 location and stores it in a working register of the CPU 0 4-2 register file 46, FIG. 3.

Decision block 84 tests the valid (V) bit 0 of the I/O page descriptor. The valid bit true indicates that the page is in memory 8. If not true, then a page fault is generated to tell the operating system to bring the page into memory 8. The page is usually in the disk subsystem. Block 86 would then call for a standard page fault routine which is implemented by hardware.

Otherwise block 88 stores the I/O page descriptor from the descriptor segment page table 56 in a working register of the CPU 0 4-2, register file 46. The location in memory 8 of the I/O descriptor is generated by adding the virtual channel number to the physical page frame number of the I/O page descriptor.

Decision block 90 compares the table size stored in the I/O page descriptor with the virtual channel number to make sure that the I/O descriptor table 58 can accommodate the virtual channel number. If the virtual channel number is greater than the size, then block 92 calls for a trap 37 indicating a virtual channel number bound fault.

If the I/O descriptor table 58 is large enough, then block 94 fetches the I/O descriptor from memory 8 and stores it in a working register of CPU 0 4-2, register file 46.

Decision block 96 tests the valid (V) bit 0 of the I/O descriptor and branches to block 98 if the bit is reset to indicate an I/O fault trap number 37.

Otherwise block 100 computes $R_{eff}$ from the ring bits 0 and 1 of the virtual I/O command.

$R_{eff}$ is the maximum value (least privileged) of the rings in which are stored the commands that make up the IOLD or I/O command.

Decision block 101 tests if the virtual I/O command is an IO command, FIGS. 2A, 2B or 2C, or an IOLD command, FIG. 2D, by examining the OP code field of the instruction in memory 8 that initiated the command. If the instruction calls for an IO command, then decision block 103 tests the $R_{eff}$ value against R1 in the I/O descriptor. If the value of $R_{eff}$ is greater than R1, then block 105 initiates a trap 38 I/O access fault operation. If $R_{eff}$ is less than or equal to R1, then the firmware branches to block 118 which replaces the virtual channel number with the physical channel number from the I/O descriptor of the I/O descriptor table 58.

Decision block 102 tests the D bit 9 of the virtual I/O command. If bit 9 indicates a device input command, the decision block 108 tests if the R bit 1 of the I/O descriptor is set and if $R_{eff}$ is less than or equal to R2, bits 6 and 7 of the I/O descriptor. If yes, then block 140 sets the M bit 2 in the IOLD buffer page descriptor. If not, then block 106 calls for an access fault 38 via the firmware access checking.

If decision block 102 indicated a device output command by testing the state of the D bit in the virtual IOLD command, then decision block 104 tests that the W bit of the I/O descriptor is set and the value $R_{eff}$ is less than or equal to R1 (bits 4 and 5) of the I/O descriptor. Otherwise block 106 generates the trap 38.

Block 110 sets the modifier (M) bit (bit 2) of the I/O page descriptor.

Decision block 112 tests if I/O bit 2 in the segment descriptor for the IOLD buffer located in the processor descriptor segment (PDS) 60 is set. If not set, then block 114 calls for a trap 14 protection violation routine. Otherwise decision block 116 tests if the IOLD buffer size is less than or equal to 2048 bytes by comparing a constant (2048) with range data field bits 0–15 of the range of FIG. 2D, second cycle. To assure that the range will not cross the page, the firmware checks that the range of FIG. 2D plus the offset is not greater than 2048. The offset is calculated during the normal virtual to physical address translation. If either test fails, then block 114 calls for the trap 14 protection violation routine.

If both tests are successful, then block 118 replaces the virtual channel number of the virtual I/O command with the physical channel number contained in the I/O descriptor.

The firmware then branches to block 74 and the IO or IOLD commands are treated as a normal command and is treated by the sybsystems coupled to the system bus 2, FIG. 1, as any normal command.

While the invention has been shown and described with reference to the preferred embodiment thereof, it will be understood by those skilled in the art that the above and other changes in form and detail may be made therein without departing from the spirit and scope of the invention.

What is claimed is:

1. Apparatus for translating a virtual I/O command to a physical I/O command comprising:
    first means for storing a virtual I/O command including a virtual channel number identifying a device;
    second means for storing s descriptor segment identifying a user;
    a first table means coupled to said first means and being responsive to a first portion of said channel number stored in said first means, said first table means coupled to said second means and being responsive to said descriptor segment identifying a user stored said second means for locating an I/O page descriptor identifying a family of devices available to said user;
    a second table means coupled to said first means and said first table means and responsive to said channel number and said I/O page descriptor for locating an I/O descriptor including a physical channel number identifying said device; and
    third means coupled to said first means and said second table means including comparison means for verifying user privilege by determining user access to a device via said user descriptor and proper virtual I/O command operation via said I/O descriptor, and in response to verification of user privilege, replacing said virtual channel number by said physical channel number, thereby generating said physical I/O command.

2. Apparatus for translating a virtual I/O command requested by a user to a physical I/O command comprising:
    first means for storing a virtual I/O command including a virtual channel number identifying a device;
    second means for storing a descriptor segment, said descriptor segment including a first field identifying said user;
    a first table means coupled to said first and to said second means and responsive to contents of said first field and a first portion of said virtual channel number for locating an I/O page descriptor, said I/O page descriptor including a second field identifying each device available to said user;
    a second table means coupled to said first means and to said first table means and responsive to contents of said second field and to said virtual channel number for locating an I/O descriptor, said I/O descriptor including a third field containing a physical channel number identifying said device; and
    third means coupled to said first means and said second table means and including comparison means for verifying user privileges by determining user access to each device via said I/O descriptor and said user descriptor segment, and in response to a positive verification of user privilege, replacing said virtual channel number by said physical channel number, thereby generating said physical I/O command.

3. Apparatus for translating a virtual input/output (I/O) command requested by a user to a physical I/O command identifying a device, said apparatus comprising:
    a first means for storing said virtual I/O command including a virtual channel number identifying said device and a first ring number identifying user privilege with respect to said device;
    a second means for storing a descriptor segment including a first field identifying said user;
    a first table means coupled to said first and to said second means and responsive to contents of said first field and to first portion of said virtual channel number for locating an I/O page descriptor, said I/O page descriptor including a second field identifying a family of devices accessible to said user;
    a second table means coupled to said first means and to said first table means and responsive to said virtual channel number and to contents of said second field for locating an I/O descriptor, said I/O descriptor including a second ring and a third field containing a physical channel number identifying said device;
    comparing means coupled to said first means and said second table means for verifying that said second ring number is grater than or equal to said first ring number, thereby verifying that said user has privilege access to said device; and
    third means coupled to said comparing means, to said first means and to said second table means for replacing said virtual channel number by said physical channel number, in response to verification of user privilege, thereby generating said physical I/O command.

4. Apparatus for translating a virtual I/O command requested by a user to a physical I/O command identifying a device, said apparatus comprising:
    a first means for storing said virtual I/O command including a virtual channel number identifying said device, a first ring number identifying user privilege with respect to said device and a direction bit indicating a read or a write operation;

a second means storing a descriptor segment including an I/O identifier in a first state indicating that the command is a virtual I/O command, and in a second state indicating that the command is a physical I/O command and that no further action is required, said descriptor segment further including a first field identifying said user;

a first table means coupled to said first and to said second means and responsive to contents of said first field and to a first portion of said virtual channel number for locating an I/O page descriptor including a second field identifying a family of devices accessible to said user;

a second table means coupled to said first means and responsive to contents of said second field and to said virtual channel number for locating an I/O descriptor including a read bit or a write bit, a second ring number and a physical channel number identifying said device;

comparing means for verifying that said second ring number is greater than or equal to said first ring number, thereby verifying that said user has privileged access to said device, and further verifying that said direction bit in a first state is equal to the state of said read bit and said direction bit in a second state is equal to the state of said write bit; and third means coupled to said comparing means, to said first means and to said second table means for replacing said virtual channel number by said physical channel number if the results of the comparison show that the read or write physical I/O command is compatible with said read bit or said write bit and said user has privileged access to said device, thereby generating said physical I/O command for transfer over a system bus.

5. Apparatus for translating a virtual IOLD command requested by a user to a physical IOLD command identifying a device, said apparatus comprising:

a first means for storing said virtual IOLD command including a virtual channel number identifying said device and a first ring number identifying user privilege with respect to said device and a range specifying a size of a block of data being transferred;

a second means for storing a descriptor segment including a first field identifying said user;

a first table means coupled to said first and to said second means and responsive to contents of said first field and to a first portion of said virtual channel number for locating an I/O page descriptor, said I/O page descriptor including a second field identifying a family of devices accessible to said user;

said first tale means further including a page descriptor means for specifying a base address of a buffer storing said block of data;

a second table means coupled to said first means and to said first table means and responsive to said virtual channel number and to contents of said second field for locating an I/O descriptor, said I/O descriptor including a second ring number and a third field containing a physical channel number identifying said device;

first comparing means coupled to said first means and to said second table means for verifying that said second ring number is greater than or equal to said first ring number, thereby verifying that said user has privileged access to said device;

second comparing means coupled to said first means and to said first table means for verifying that said range is less than or equal to a predetermined amount and that said buffer does not overflow a page; and third means coupled to said first and to said second comparing means, to said first means and to said second means for replacing said virtual channel number by said physical channel number in response to verification of user privilege, thereby generating said physical I/O command.

* * * * *

UNITED STATES PATENT AND TRADEMARK OFFICE
CERTIFICATE OF CORRECTION

PATENT NO. : 4,858,117

DATED : August 15, 1989

INVENTOR(S) : Joseph G. DiChiara, Harry W. Brown, Joseph M. Valentine

It is certified that error appears in the above-identified patent and that said Letters Patent is hereby corrected as shown below:

Column 1, the insert at line 45, delete "Trademark of Massachusetts Institute of Technology" and insert --*Trademark of Bull HN Information Systems Inc.--.

Signed and Sealed this

Twenty-sixth Day of June, 1990

Attest:

HARRY F. MANBECK, JR.

*Attesting Officer*  *Commissioner of Patents and Trademarks*